(12) United States Patent
Yang et al.

(10) Patent No.: US 7,304,818 B2
(45) Date of Patent: Dec. 4, 2007

(54) PRECONDITIONING AN ELASTOMERIC STOP MEMBER FOR USE AS A REFERENCE POSITION

(75) Inventors: Xin H. Yang, Fremont, CA (US); S. Craig Smith, Sunnyvale, CA (US); Lin Guo, Saratoga, CA (US); Yu Sun, Fremont, CA (US); Brian Rigney, Louisville, CO (US); Stan Shepherd, Morgan HIll, CA (US); Yuan Chen, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/545,184

(22) Filed: Oct. 10, 2006

(65) Prior Publication Data

US 2007/0159713 A1   Jul. 12, 2007

Related U.S. Application Data

(60) Provisional application No. 60/725,034, filed on Oct. 7, 2005.

(51) Int. Cl.
G11B 5/56 (2006.01)
G11B 21/12 (2006.01)

(52) U.S. Cl. .................. 360/75; 360/265.1
(58) Field of Classification Search ............ None
See application file for complete search history.

(56) References Cited

U.S. PATENT DOCUMENTS

| 4,414,589 | A | 11/1983 | Oliver et al. |
| 5,570,247 | A | 10/1996 | Brown et al. |
| 5,668,679 | A | 9/1997 | Swearingen et al. |
| 5,949,603 | A | 9/1999 | Brown et al. |
| 5,973,888 | A | 10/1999 | Chawanya et al. |
| 6,031,080 | A | 2/2000 | Williams et al. |
| 6,040,955 | A | 3/2000 | Brown et al. |
| 6,141,853 | A | * 11/2000 | O'Donnell ............ 29/446 |
| 6,507,450 | B1 | 1/2003 | Elliott |
| 6,603,627 | B1 | 8/2003 | Chainer et al. |
| 6,633,451 | B1 | 10/2003 | Chainer et al. |
| 6,785,075 | B2 | 8/2004 | Bryant et al. |
| 6,798,610 | B1 | 9/2004 | Deng et al. |
| 6,888,696 | B2 * | 5/2005 | Yasuna et al. ......... 360/78.04 |
| 6,963,458 | B2 | 11/2005 | Lamberts |
| 6,967,822 | B2 * | 11/2005 | Chang et al. ........... 360/265.1 |
| 7,019,937 | B1 | 3/2006 | Liikanen et al. |
| 7,046,474 | B2 * | 5/2006 | Kuramoto et al. ....... 360/75 |
| 7,061,723 | B2 | 6/2006 | Price |
| 7,075,748 | B2 * | 7/2006 | White et al. ........... 360/78.05 |
| 2004/0160696 | A1 | 8/2004 | Meyer |
| 2004/0212931 | A1 * | 10/2004 | Takami ................ 360/265.1 |
| 2005/0068658 | A1 | 3/2005 | Yamamoto |
| 2005/0280916 | A1 | 12/2005 | Calfee et al. |

* cited by examiner

Primary Examiner—Hoa T. Nguyen
Assistant Examiner—James L Habermehl
(74) Attorney, Agent, or Firm—Fellers, Snider, et al.

(57) ABSTRACT

An apparatus and associated method for preconditioning an elastomeric stop member to create a stabilized reference position for a moveable member by repetitively biasing the moveable member against the stop member and using the stabilized reference position to initiate a writing of servo data by the moveable member to a storage surface.

19 Claims, 7 Drawing Sheets

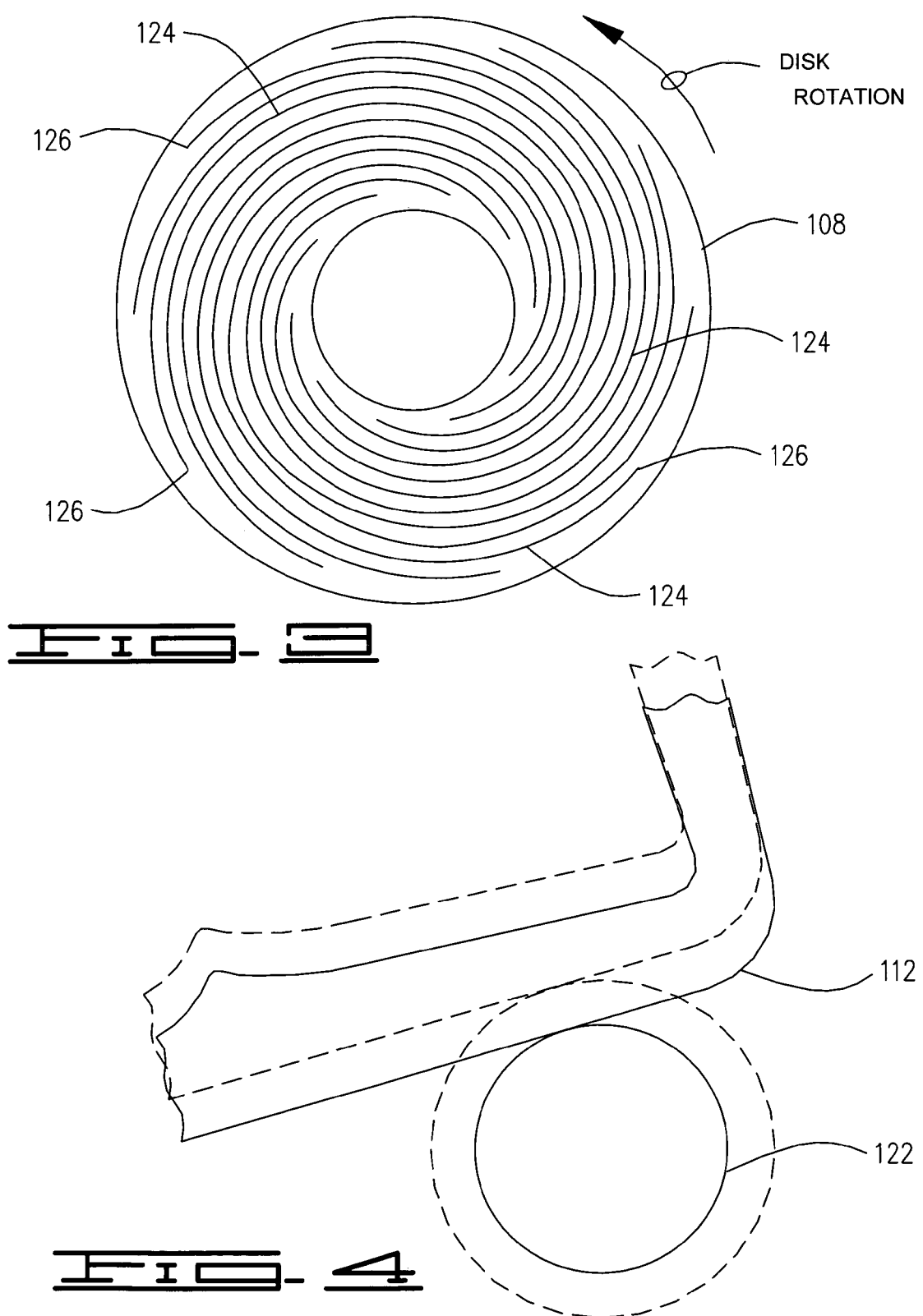

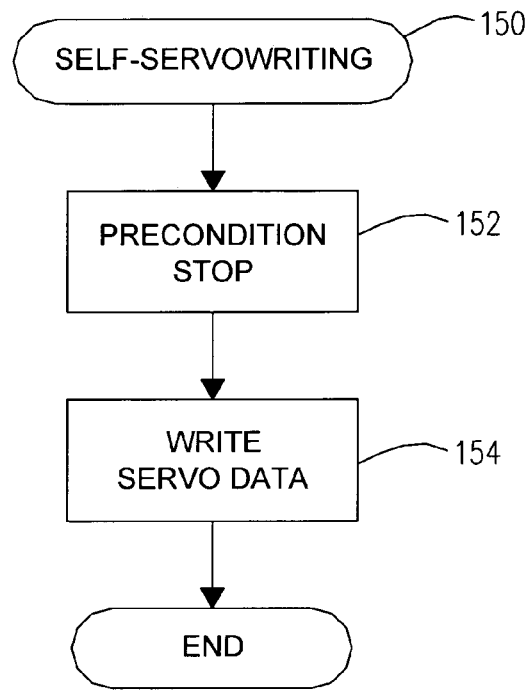
INITIAL POSITION ON CRASH STOP:
160 SPIRALS WRITTEN (1000 WARM UPS)
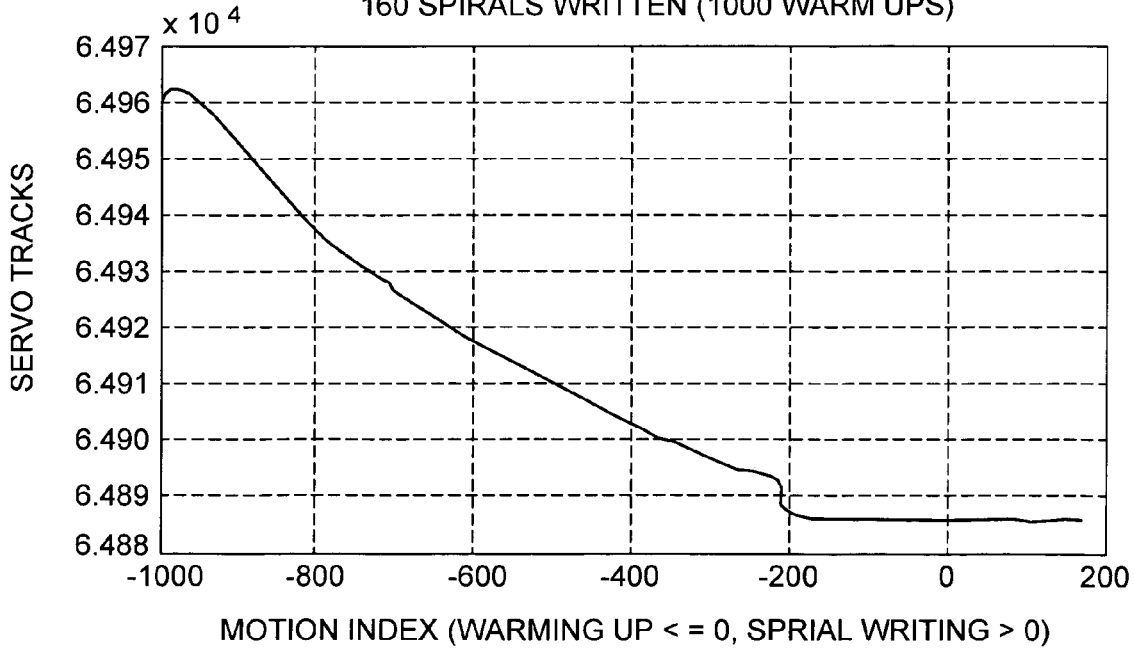

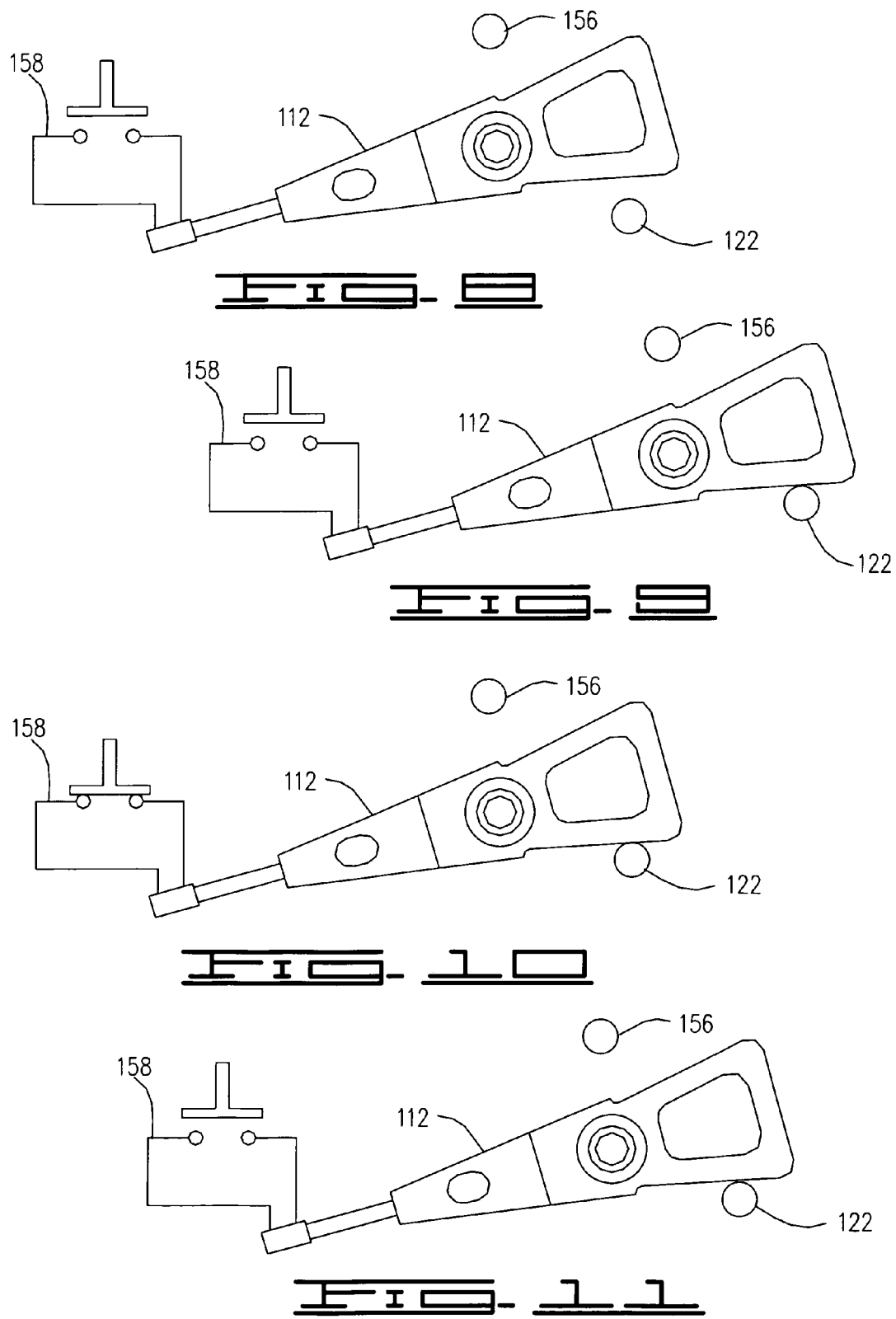

PRECONDITIONING AN ELASTOMERIC STOP MEMBER FOR USE AS A REFERENCE POSITION

RELATED APPLICATIONS

The present application makes a claim of domestic priority to U.S. Provisional Patent Application No. 60/725,034 filed Oct. 7, 2005.

FIELD OF THE INVENTION

The claimed invention relates generally to the field of data storage and more particularly, but not by way of limitation, to an apparatus and method for self-servowriting servo patterns to a data storage medium.

BACKGROUND

Disc drives are data storage devices that store digital data in magnetic form on a rotating disc. Modem disc drives comprise one or more storage discs that are coated with a magnetizable medium and mounted on the hub of a spindle motor for rotation at a constant high speed. Information is stored on the discs in a plurality of tracks, typically by an array of transducers ("heads") mounted to a radial actuator for movement of the heads relative to the discs.

During a write operation data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per millimeter). Increased track density requires more closely-spaced, narrow tracks, and therefore requiring enhanced accuracy in the recording of servo-patterns onto the target disc surface. This increased accuracy requires that servo-track recording be accomplished within the increased tolerances, while remaining cost effective.

Servo patterns can be recorded on the magnetizable medium of a target disc by a servo track writer ("STW"), either prior to or during the final assembly of the disc drive. Generally, a STW is manufacturing equipment that controls servowriting activities either directly to the discs, or by controlling the partially-assembled disc drive. In either event, however, the purchase and upkeep of the number of STWs necessary to support production requirements can be an alarming capital investment to a business. Recent improvements have been directed at eliminating the need for the STW by using the disc drive components themselves to write the servo patterns. This is known as self-servowriting.

These and other recent improvements in the art have significantly improved both, often competing, goals of enhanced quality and faster throughput. It is to the furthering of those efforts that the embodiments of the present invention are directed.

SUMMARY OF THE INVENTION

Embodiments of the present invention are generally directed to self-servowriting of servo information to a data storage device.

In some embodiments a preconditioning method is provided for (a) biasing a moveable member against an elastomeric stop member with a predefined force; (b) biasing the moveable member away from the stop member; (c) biasing the moveable member against the stop member again with the force to achieve a steady state position of the moveable member; and (d) repeating steps (b)-(c) sequentially to achieve a desired reduction in a difference between successive values of the steady state position.

In some embodiments a method is provided for preconditioning an elastomeric stop member to create a stabilized reference position for a moveable member by repetitively biasing the moveable member against the stop member. The method then uses the stabilized reference position to initiate a writing of servo data by the moveable member to a storage surface.

In some embodiments an apparatus is provided with a preconditioning component including programming instructions stored in memory that are executable to repetitively bias a moveable member against an elastomeric stop member, thereby creating a stabilized reference position to initiate a writing of servo data by the moveable member to a storage surface.

In some embodiments a data storage device is provided having an actuator moving a transducer in a data transfer relationship with a storage medium, and means for positioning the actuator against an elastomeric stop member for use as a reference position in writing servo data to the storage medium.

These and various other features and advantages which characterize the claimed invention will become apparent upon reading the following detailed description and upon reviewing the associated drawings.

BRIEF DESCRIPTION OF THE DRAWINGS

FIG. 3 diagrammatically depicts a plurality of spaced apart spiral servo patterns written to the storage medium of the data storage device of FIG. 1.

FIG. 4 is an enlarged detail depiction of the actuator's affect on the elastomeric stop after repeated contacting engagement.

FIG. 7 is a flowchart of steps in a method of SELF-SERVOWRITING in accordance with embodiments of the present invention.

FIGS. 8-11 diagrammatically depict steps in preconditioning methods of the present embodiments.

FIG. 14 is a graphical depiction of test data obtained while practicing embodiments of the present invention.

DETAILED DESCRIPTION

Figure 1:
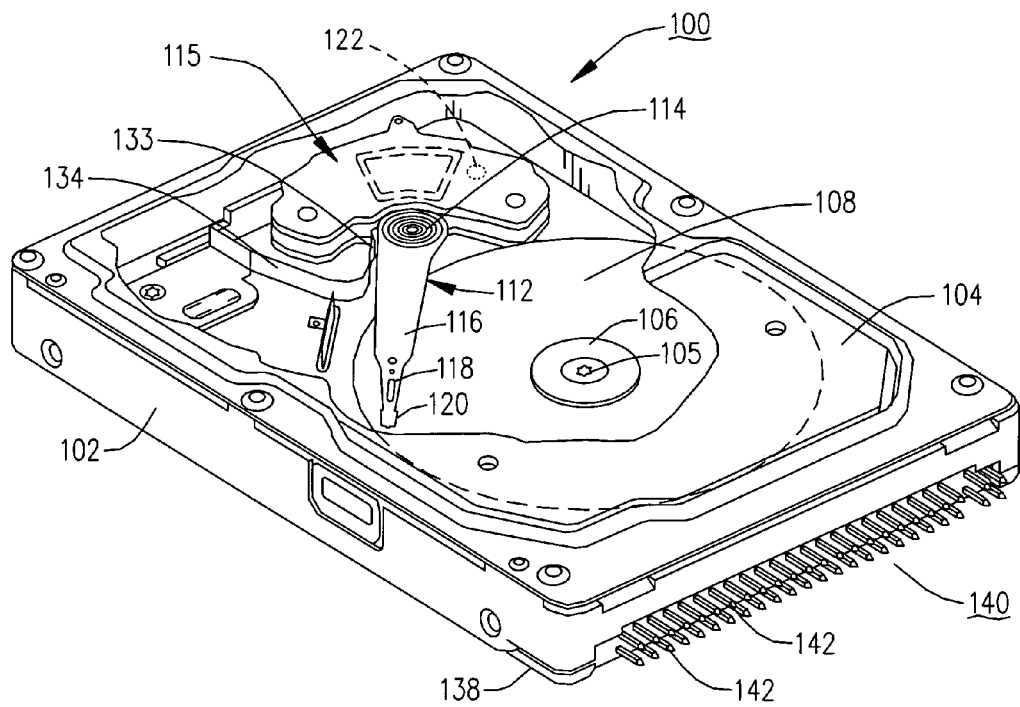
FIG. 1 is an isometric view of a data storage device constructed in accordance with embodiments of the present invention.

Referring to the drawings in general, and more particularly to FIG. 1 that shows an isometric view of a data storage device 100 (or "drive") constructed in accordance with embodiments of the present invention. The drive 100 preferably includes a base 102 and a cover 104 (partially cutaway), which together provide a housing for a number of components. The components include a motor 105 to which a clamp 106 is attached for fixing one or more storage mediums 108 (or "discs") in rotation therewith. Adjacent the disc 108 is an actuator 112 that is pivotable around a bearing assembly 114 by selectively energizing a wound coil portion of the actuator 112, forming a part of a voice coil motor ("VCM") 115. The actuator 112 further includes an arm 116 supporting a load arm 118 that, in turn, supports a head 120 (or "transducer") at a distal end thereof in a data transfer relationship with the disc 108. Each disc 108 can be divided into data tracks, and the head 120 is positioned to retrieve data from and store data to the tracks.

A stop 122 is disposed in the path of actuator 112 travel to limit movement of the head 120 to a desired position, such as the outer region of the disc 108. In equivalent alternative embodiments, for example, the stop 122 can be used to limit travel of the head 120 into an unloading ramp beyond the outer diameter of the disc 108. The stop 122 is preferably constructed of an elastomeric material, or has an elastomeric covering, to damp the contacting engagement between the actuator 112 and the stop 122. For example, the contacting engagement can occur during a runaway condition of the actuator 112. In the present embodiments the contacting engagement occurs because the stop 122 is used as a reference position from which the head 120 initiates self-servowriting of one or more servo data patterns.

To provide the requisite electrical conduction paths between the head 120 and drive 100 control circuitry, the head 120 advantageously has a flex circuit that is routed on the actuator 112 from the head 120, along the load arm assembly 118 and the arm 116, and to a preamp circuit 133 that is supported by the actuator 112. The preamp circuit 133 connects the head 120 flex circuit to another flex circuit 134 which passes through the base 102 to a printed circuit board (PCB) 138. An electrical connector 140 attached to the PCB 138 has a plurality of contacts 142 for connecting the drive 100 to a mating connector (not shown), such as for placing the drive 100 in communication with external control circuitry.

Figure 2:
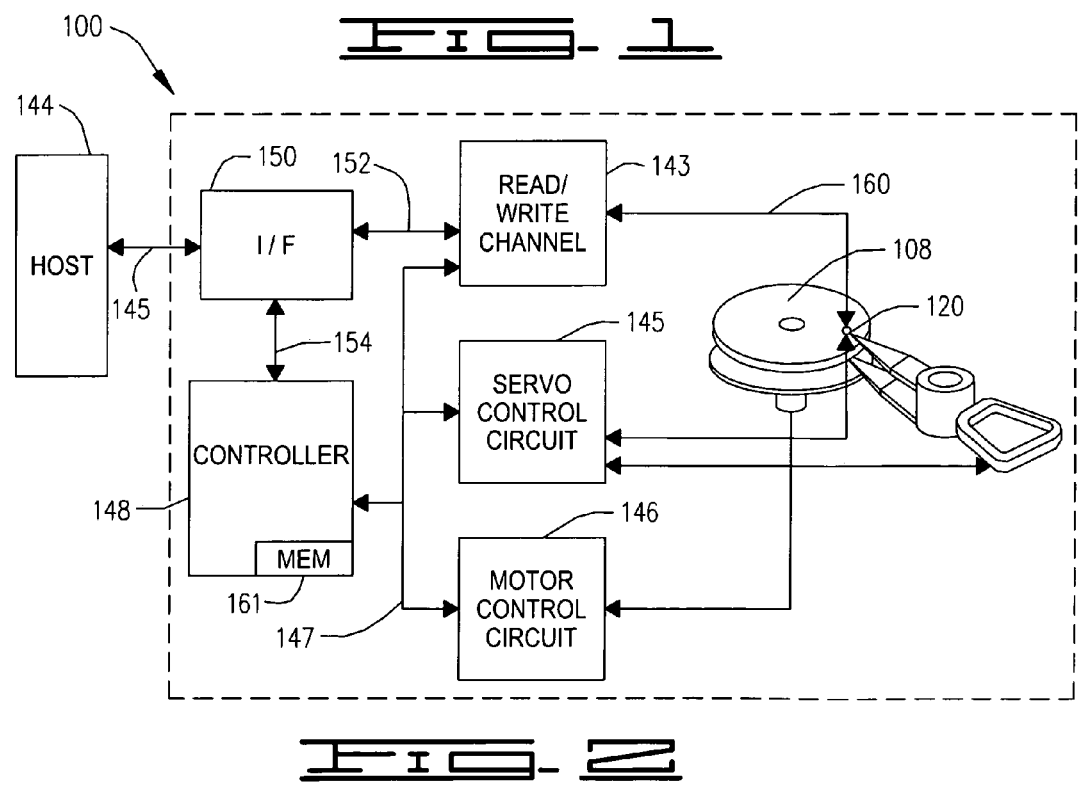
FIG. 2 is a control block diagram of the data storage device of FIG. 1.

FIG. 2 is a functional block diagram illustrating types of control signals and data transfers that can be passed between the drive 100 and a remote device, such as with a host 144 via a bus 145. The drive 100 generally has a read/write channel 143, a servo control circuit 145, and a motor control circuit 146, all connected by a control bus 147 to a controller 148. An interface circuit 150 is connected to the read/write channel 143 by bus 152 and to the controller 148 by bus 154. The interface circuit 150 serves as a communications interface between the drive 100 and the host device (or other remote device as described below).

Generally, in response to an access command from the host 144, and received by the controller 148 from the interface 150, the controller 148 controls the flow of data to and from the disc 108. The read/write channel 143, in turn, provides store and retrieve signals to the head 120 in order to store data to the disc 108 and retrieve data from the disc 108. The head 120 can, for example, provide an analog read signal to the read/write channel 143, which in turn converts the analog read signal to digital form and performs the necessary decoding operations to provide data to the interface circuit 150 for output to the host 144. The read/write channel 143 conversely energizes the head 120 to assert a write gate signal, such as a servo write gate signal, discussed below, for writing servo synch marks.

In accordance with the present embodiments, and described below, a preconditioning component ("PRECON") 161 exists as programming instructions stored in memory and executable by the controller 148 to repetitively bias the actuator 112 against the elastomeric stop 122, and thereby create a stabilized reference position to initiate a writing of servo data by the head 120 to a storage surface of the disc 108. For example, FIG. 3 depicts how the present embodiments can be practiced to self-servowrite a plurality of spaced apart spiral servo patterns 124. In alternative equivalent embodiments the servo patterns can be concentric. The spiral servo patterns 124 traverse the entire data storage surface of the disc 108 in one complete revolution of the disc 108, although the present embodiments are not so limited. The diagrammatic depiction of FIG. 2 has only ten spiral servo patterns 124 for clarity sake. The number of spiral servo patterns 124 in a full compliment will depend on the servo sampling rate of the control electronics.

As the head 120 traverses the spiral pattern 124, the drive 100 asserts a servo write gate signal with a duty cycle that writes a plurality of corresponding synch marks. In order to ensure that corresponding synch marks of different spirals are radially aligned, it is imperative that each of the spiral servo patterns 124 begin substantially at a common radius of the disc 108, denoted as radius 126.

Using the elastomeric stop 122 as a reference position for initiating each of the spiral servo patterns 124 can be problematic, because it has been observed that the elastomeric contact surface does not provide a reliably repeatable reference position. Generally, it was observed that the physical size of the elastomeric stop 122 changed as it was repeatedly contacted while being used as a reference position to initiate each of the spiral patterns 124. This resulted in the radial beginning position 126 of each of the servo patterns 124 varying unacceptably.

FIG. 4 is an enlarged detail depiction of the wound coil portion of the actuator 112 repeatedly contacting the elastomeric stop 122 with a predefined VCM biasing force (constant DAC command level). It was observed that between the first contacting engagement (solid lines) and the last of a plurality of contacting engagement (broken lines), all at the same VCM biasing force, the elastomeric material expanded. The expanded elastomeric material changed the reference position of the actuator 112 by too many tracks to reliably initiate servo data patterns.

The present description is based on the embodiments depicted in FIG. 4 whereby the elastomeric stop 122 expands but retains its circular cross sectional shape. However, the type and extent of the change in physical size will depend on the type of elastomeric material the stop 122 is constructed of. The present embodiments are not limited to the type and extent of physical change shown in FIG. 4 and described herein.

Figure 5:
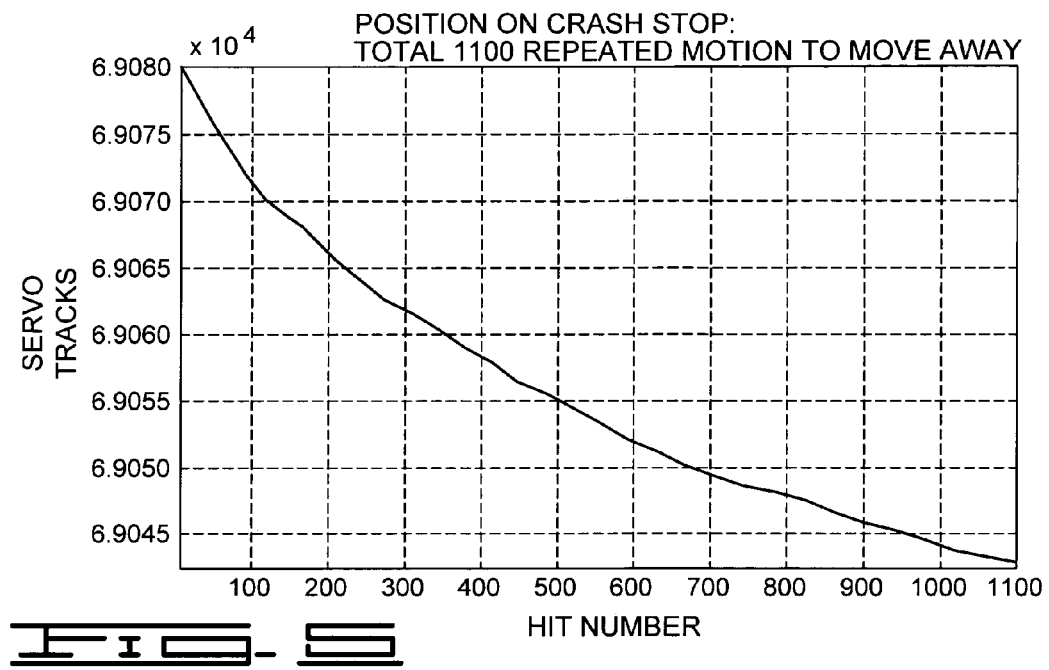
FIG. 5 is a graphical depiction of test data obtained while practicing preconditioning methods of the present embodiments.

FIG. 5 graphically depicts test data obtained during reduction to practice of the present embodiments. The test data shows that after 1,100 repeated hits the elastomeric member expansion changed the reference position of the head 120 by about thirty-six data tracks. It will be noted, however, that the slope of the curve diminishes as the number of hits increases. It was determined, therefore, that in some embodiments the PRECON 161 can consist solely of repetitious contacting engagement of the actuator 112 against the stop 122 until the curve flattens out.

Figure 6:
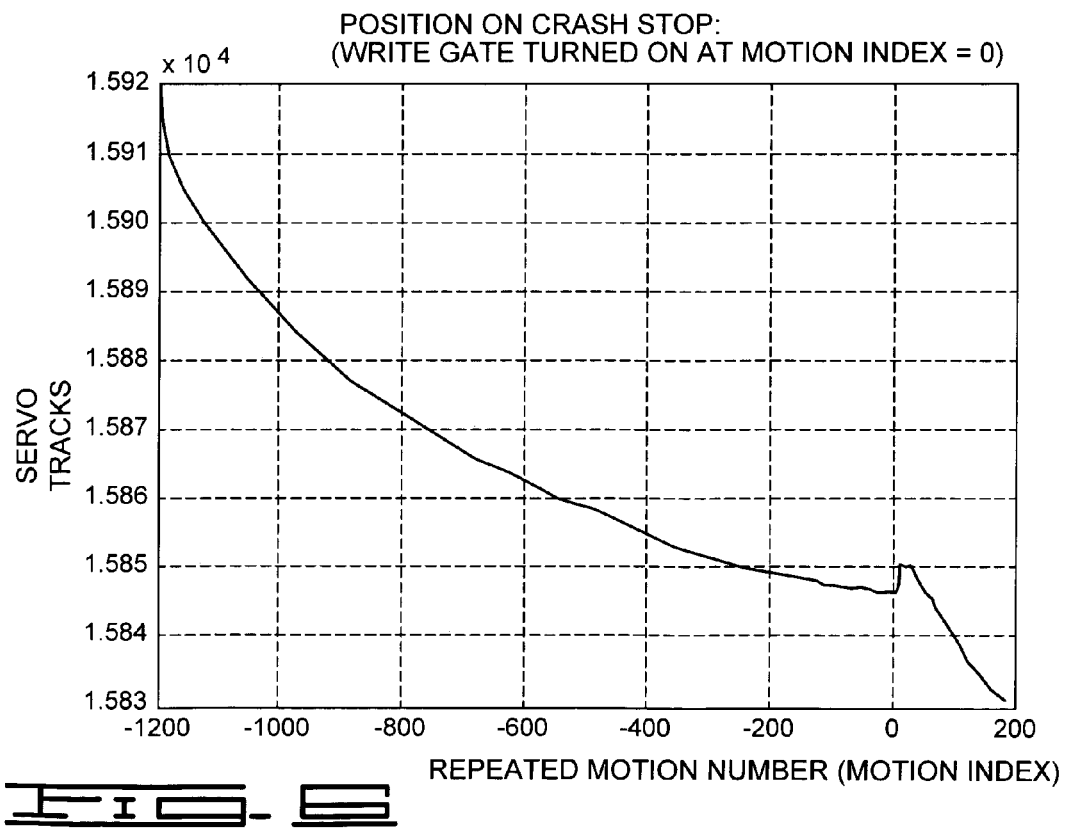
FIG. 6 is a graphical depiction of test data obtained while practicing preconditioning methods of the present embodiments.

However, it was further observed during reduction to practice of the present embodiments that the curve of FIG. 5 can be flattened out quicker, and in fewer contacting engagement repetitions, by also asserting the write gate of the preamp electronics while contactingly engaging the stop 122. FIG. 6, for example, graphically depicts a first 1,200 repetitions of contactingly engaging the stop 122, with results similar to that of FIG. 5. At sample number zero the preconditioning write gate signal was asserted. Note that this resulted in an initial increase in the actuator 112 reference position, followed by a continued decrease of the reference position but at a much greater rate of change in comparison to the first 1,200 samples.

Accordingly, FIG. 7 illustrates steps in a method 150 for SELF-SERVOWRITING in accordance with embodiments of the present invention. The method 150 begins in block 152 with preconditioning the elastomeric stop member 122 to create a stabilized reference position for the actuator 112 by repetitively biasing the actuator 112 against the stop member 122. In block 154 the stabilized reference position is used to initiate a writing of servo data by the actuator 112 to the storage surface of the disc 108.

Figure 12:
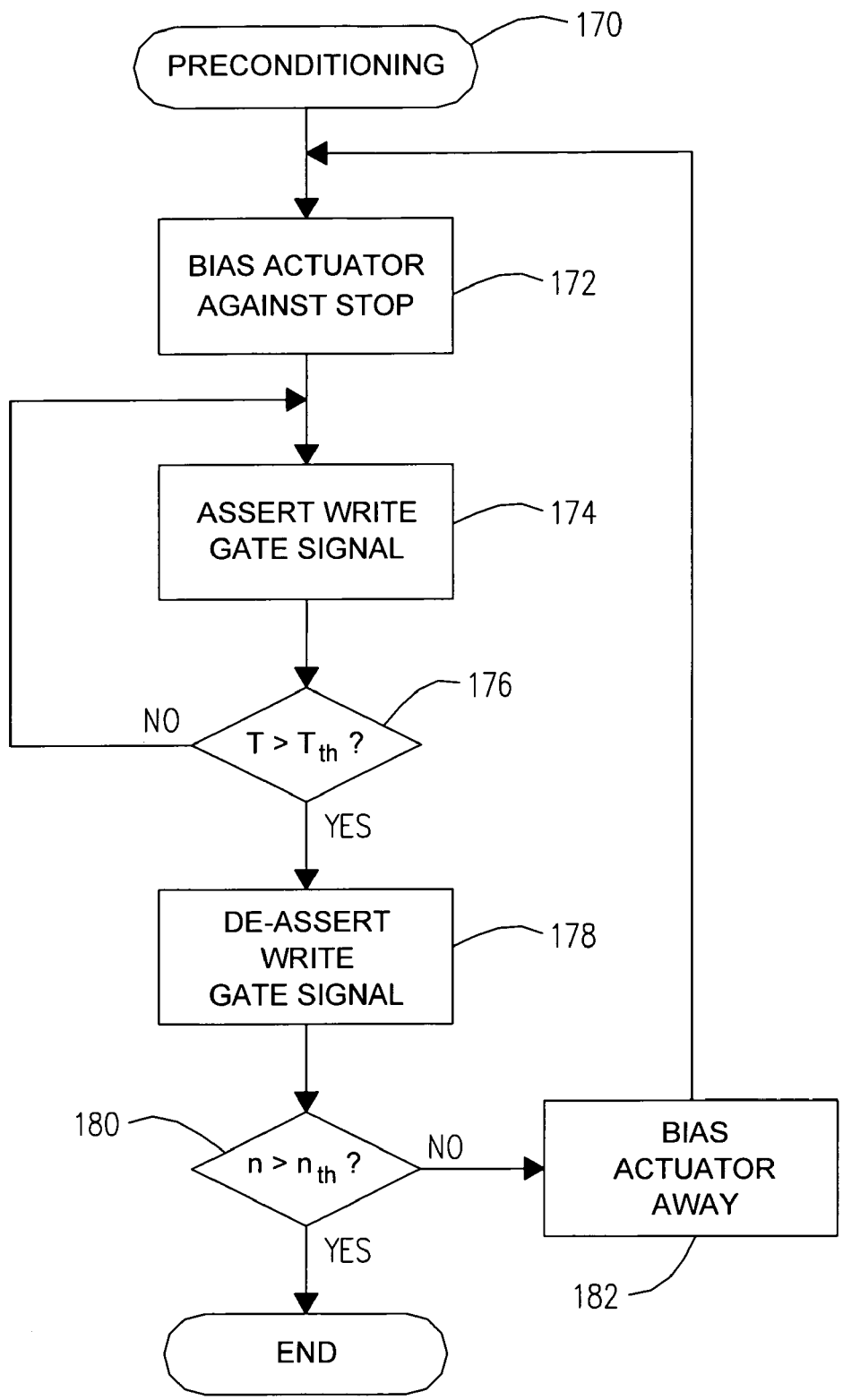
FIG. 12 is a flowchart of steps in a method of PRECONDITIONING in accordance with embodiments of the present invention.

In some embodiments the preconditioning step 152, set by the PRECON 161, is accelerated by combining the step of asserting the preconditioning write gate signal with that of repeatedly contactingly engaging the stop 122. The diagrammatic depictions of FIGS. 8-11 and the flowchart of FIG. 12 illustrate such embodiments.

In FIG. 8 the actuator 112 is biased away from the stop 122. Incidentally, a mating stop 156 limits pivotal movement of the actuator at a head 120 position corresponding to an inner region of the disc 108. The write gate 158 of the preamp electronics is depicted schematically as being de-asserted. In FIG. 9 the actuator 112 is biased against the stop 122 with a predefined VCM biasing force to achieve a steady state position. It will be noted that the write gate 158 remains de-asserted in FIG. 9.

In FIG. 10 the write gate 158 is asserted for a predefined interval while the actuator 112 remains biased against the stop 122 with the VCM biasing force. In some embodiments described below, the interval during which the write gate 158 is asserted is defined in relation to a duty cycle of the servo write gate signal employed during writing the servo pattern.

When the preconditioning write gate signal interval is elapsed, FIG. 11 depicts the write gate 158 again being de-asserted while the actuator 112 remains biased against the stop 122 with the VCM biasing force.

The steps associated with FIGS. 8-11 are repeated a number of times to achieve a desired reduction in a difference between successive values of the steady state position of the actuator 112, as it is biased against the stop 122 with the VCM biasing force. The desired difference between successive values of the steady state position can be observed directly by the servo positioning capability of the drive 100. Alternatively, the desired difference between successive values of the steady state position can be empirically determined for a given drive 100 design, and subsequently implemented in terms of a predefined number of iterations of repeating the steps associated with FIGS. 8-11.

Related to the steps associated with FIGS. 8-11, FIG. 12 is a flowchart of steps of a method 170 of PRECONDITIONING provided by the PRECON 161 in accordance with embodiments of the present invention. The method 170 begins in block 172 with biasing the actuator 112 against the stop 122 with a predefined VCM biasing force. In block 174 the preconditioning write gate signal is asserted. In block 176 it is determined whether the predefined interval for asserting the preconditioning write gate signal has elapsed. If the determination of block 176 is no, then control returns to block 174; otherwise, control passes to block 178 where the preconditioning write gate signal is de-asserted. In block 180 it is determined whether a predefined number of iterations has occurred. If the determination of block 180 is no, then in block the 182 the actuator is biased away from the stop 122 and control returns to block 172; otherwise, the method 170 ends.

Figure 13:
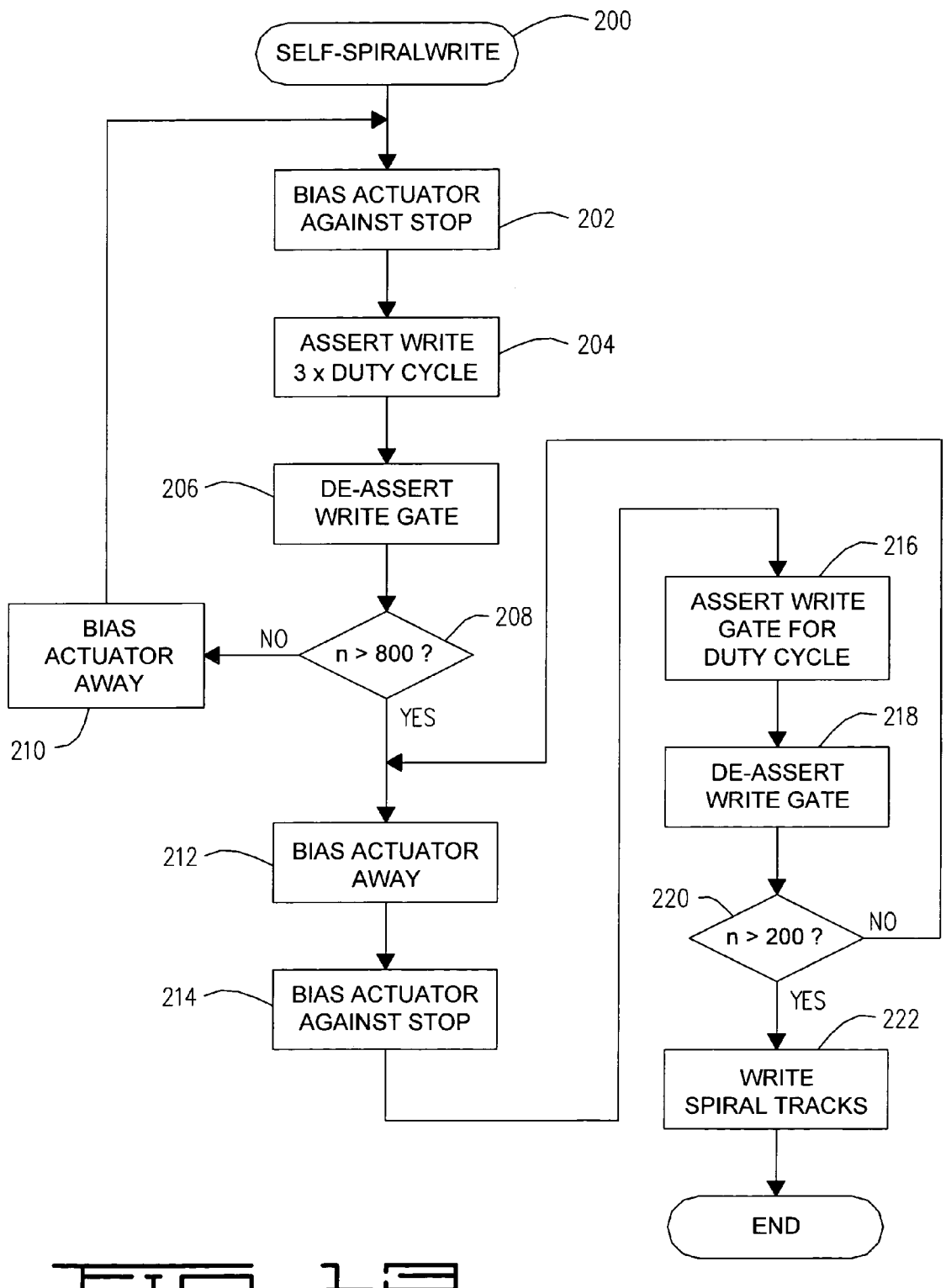
FIG. 13 is a flowchart of steps in a method of SELF SPIRAL SERVOWRITING in accordance with embodiments of the present invention.

FIG. 13 is a flowchart of steps in a method 200 for SELF SPIRAL SERVOWRITING that employs two preconditioning phases, first a long duty cycle phase 190 and then a short duty cycle phase 192. The method 200 begins in block 202 by biasing the actuator 112 against the stop 122 with a predefined VCM biasing force, which biasing force remains constant throughout the method 200. In block 204 the preconditioning write gate signal is asserted for about three-times the servo write gate signal duty cycle. The preconditioning write gate signal is then de-asserted in block 206. In block 208 it is determined whether the number of iterations of the long duty cycle phase 190 equals 800. If the determination of block 208 is no, then the actuator 112 is biased away from the stop 122 in block 210 and control returns to block 202.

If the determination of block 208 is yes, then the actuator 112 is biased away from the stop 122 in block 212 and then biased against the stop 122 again in block 214. In block 216 the preconditioning write gate signal is asserted for an interval substantially equal to the servo write gate signal duty cycle. In block 218 the preconditioning write gate signal is de-asserted. In block 220 it is determined whether the number of iterations of the short duty cycle phase 192 equals 200. If the determination of block 220 is no then control returns to block 212. If the determination of block 220 is yes, then the writing of 160 spiral servo patterns is performed in block 222.

FIG. 14 is a graphical depiction of test data obtained during reduction to practice of the present embodiments according to the method 200 of FIG. 13. It will be noted that the preconditioning steps of the elastomeric stop 122 provided a stabilized reference position not only during the writing of the spiral servo patterns, which began at sample zero, but also well in advance of the writing of the spiral servo patterns as well.

Generally, the present embodiments contemplates "going through the motions" of spiral servo track writing; that is, executing beforehand all the motions and activities associated with spiral servo track writing, but without actually writing patterns on the data storage portions of the disc. This results in transient effects attenuating before any servo tracks are actually written. The "going through the motions"

preferably simulates or even accentuates actual writing conditions without actually writing. For example, warming up both the preamp electronics and the mechanics is done by repetitiously asserting the write gate with a duty cycle matching that used during writing. After a sufficient number of repetitions, the writing process is engaged smoothly and repeatably.

It will be noted that the embodiments described herein include that of a data storage device having an actuator moving a transducer in a data transfer relationship with a storage medium, and means for positioning the actuator against an elastomeric stop member for use as a reference position in writing servo data to the storage medium. For purposes of this description and meaning of the appended claims, the term "means for positioning" expressly contemplates the PRECON 161 component of the control circuitry and the preconditioning routine it employs in making the elastomeric stop 122 a stabilized reference position from which servo data patterns can be reliably written. The term "means for positioning" expressly does not contemplate other attempted solutions that do not conduct a preconditioning routine on the stop 122 by repeatedly asserting the conditioning write gate signal and/or repetitively biasing the actuator 112 against the stop 122.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a self-servowriting spiral servo tracks in a data storage device, it will be appreciated by those skilled in the art that the claimed subject matter is not so limited and various other processing systems can be utilized without departing from the spirit and scope of the claimed invention.

What is claimed is:

1. A preconditioning method comprising:
   (a) biasing a moveable member against an elastomeric stop member with a predefined force;
   (b) biasing the moveable member away from the stop member;
   (c) biasing the moveable member against the stop member again with the force to achieve a steady state position of the moveable member;
   (d) repeating steps (b)-(c) sequentially to achieve a desired reduction in a difference between successive values of the steady state position; and
   (e) initiating a writing of servo data to a storage surface with the moveable member using the stop member as a reference position.

2. The method of claim 1 further comprising asserting a preconditioning write gate signal during step (c).

3. The method of claim 2 further comprising asserting the preconditioning write gate signal for an interval that is defined in relation to a duty cycle of a servo write gate signal employed during writing the servo data.

4. The method of claim 2 wherein the initiating step comprises writing a plurality of spaced apart spiral servo patterns.

5. The method of claim 2 wherein the desired difference between successive values of the steady state position is defined in relation to observed positions of the moveable member.

6. The method of claim 2 wherein the desired difference between successive values of the steady state position is predefined in relation to a number of iterations of step (d).

7. A method comprising:
   preconditioning an elastomeric stop member to create a stabilized reference position for a moveable member by repetitively biasing the moveable member against the stop member; and
   using the stabilized reference position to initiate a writing of servo data by the moveable member to a storage surface.

8. The method of claim 7 wherein the preconditioning step further comprises asserting a preconditioning write gate signal while the moveable member is biased against the stop member.

9. The method of claim 8 wherein the preconditioning step further comprises asserting the preconditioning write gate signal for an interval that is defined in relation to a duty cycle of a servo write gate signal employed in writing a servo pattern during the using step.

10. The method of claim 9 wherein the using step comprises writing a plurality of spaced apart spiral servo patterns each beginning at the stabilized reference position and traversing the storage surface.

11. The method of claim 10 wherein the preconditioning step comprises:
    (a) biasing the moveable member against the stop member with a predefined force and asserting the preconditioning write gate signal for the interval;
    (b) biasing the moveable member away from the stop member;
    (c) biasing the moveable member against the stop member again with the force and asserting the preconditioning write gate signal for the interval to obtain a steady state position of the moveable member; and
    (d) repeating steps (b)-(c) sequentially to achieve a desired reduction in a difference between successive values of the steady state position.

12. The method of claim 11 wherein the repeating step (d) comprises a first number of iterations that is greater than a number of servo patterns that are written during the using step, and wherein the interval is greater than a duty cycle of the servo write gate signal.

13. The method of claim 12 wherein the repeating step (d) further comprises a second number of iterations that is substantially equal to the number of servo patterns that are written during the using step, and wherein the interval is substantially equal to the servo write gate signal duty cycle.

14. The method of claim 13 wherein the using step is characterized by writing a full compliment of data storage patterns to the storage surface.

15. An apparatus comprising a preconditioning component comprising programming instructions stored in memory that are executable to repetitively bias a moveable member against an elastomeric stop member and thereby create a stabilized reference position to initiate a writing of servo data by the moveable member to a storage surface.

16. The apparatus of claim 15 wherein the preconditioning component is operably characterized by asserting a preconditioning write gate signal while the moveable member is biased against the stop member.

17. The apparatus of claim 16 wherein the preconditioning component is operably characterized by asserting the preconditioning write gate signal for an interval that is defined in relation to a duty cycle of a servo write gate signal employed in writing a servo pattern to the storage surface.

18. The apparatus of claim 17 wherein the preconditioning component is operably characterized by:
(a) biasing the moveable member against the stop member with a predefined force and asserting the preconditioning write gate signal for the interval;
(b) biasing the moveable member away from the stop member;
(c) biasing the moveable member against the stop member again with the force and asserting the preconditioning write gate signal for the interval to obtain a steady state position of the moveable member; and
(d) repeating steps (b)-(c) sequentially to achieve a desired reduction in a difference between successive values of the steady state position.

19. A data storage device, comprising:

an actuator moving a transducer in a data transfer relationship with a storage medium; and means for positioning the actuator against an elastomeric stop member for use as a reference position in writing servo data to the storage medium.

* * * * *